(12) United States Patent
Roundtree

(10) Patent No.: US 7,756,545 B2
(45) Date of Patent: Jul. 13, 2010

(54) METHOD FOR PERFORMING INTERACTIVE SERVICES ON A MOBILE DEVICE, SUCH AS TIME OR LOCATION INITIATED INTERACTIVE SERVICES

(75) Inventor: Brian Roundtree, Kirkland, WA (US)

(73) Assignee: SNAPin Software Inc., Bellevue, WA (US)

( * ) Notice: Subject to any disclaimer, the term of this patent is extended or adjusted under 35 U.S.C. 154(b) by 704 days.

(21) Appl. No.: 11/685,108

(22) Filed: Mar. 12, 2007

(65) Prior Publication Data

US 2007/0207795 A1 Sep. 6, 2007

Related U.S. Application Data

(63) Continuation of application No. PCT/US2006/062047, filed on Dec. 13, 2006.

(60) Provisional application No. 60/749,854, filed on Dec. 13, 2005, provisional application No. 60/849,390, filed on Oct. 3, 2006.

(51) Int. Cl.
 *H04M 1/00* (2006.01)
(52) U.S. Cl. ............. 455/550.1; 455/403; 455/422.1; 370/328; 370/338
(58) Field of Classification Search ............. 455/550.1, 455/403, 422.1; 370/328, 338
See application file for complete search history.

(56) References Cited

U.S. PATENT DOCUMENTS

| | | | |
|---|---|---|---|
| 5,475,735 | A | 12/1995 | Williams et al. |
| 5,675,628 | A | 10/1997 | Hokkanen |
| 5,790,798 | A | 8/1998 | Beckett, II et al. |
| 5,831,598 | A | 11/1998 | Kauffert et al. |
| 5,845,211 | A | 12/1998 | Roach, Jr. |
| 6,031,467 | A | 2/2000 | Hymel et al. |
| 6,151,507 | A * | 11/2000 | Laiho et al. ............. 455/466 |
| 6,199,045 | B1 | 3/2001 | Giniger et al. |
| 6,219,047 | B1 | 4/2001 | Bell |
| 6,245,756 | B1 | 6/2001 | Patchev et al. |
| 6,246,756 | B1 | 6/2001 | Borland et al. |
| 6,301,480 | B1 | 10/2001 | Kennedy, III et al. |
| 6,368,205 | B1 | 4/2002 | Frank et al. |
| 6,370,399 | B1 | 4/2002 | Phillips |
| 6,389,278 | B1 | 5/2002 | Singh |
| 6,424,945 | B1 | 7/2002 | Sorsa et al. |

(Continued)

FOREIGN PATENT DOCUMENTS

CA 2454334 A1 2/2003

(Continued)

OTHER PUBLICATIONS

U.S. Appl. No. 12/444,332, filed Dec. 28, 2009, Roundtree.

(Continued)

*Primary Examiner*—Nghi H Ly
(74) *Attorney, Agent, or Firm*—Perkins Coie LLP

(57) ABSTRACT

A system for performing interactive services at a mobile device is disclosed. In some cases, the system receives an indication of an event, and provides interactive services to a user of the mobile device based on the event. In some cases, an indication of an event in invokes a script-based process that determines one or more actions to present to a user of the mobile device.

17 Claims, 7 Drawing Sheets

U.S. PATENT DOCUMENTS

| | | |
|---|---|---|
| 6,430,252 B2 | 8/2002 | Reinwand et al. |
| 6,430,407 B1 | 8/2002 | Turtiainen et al. |
| 6,466,783 B2 | 10/2002 | Dahm et al. |
| 6,496,979 B1 | 12/2002 | Chen et al. |
| 6,615,038 B1 | 9/2003 | Moles et al. |
| 6,618,478 B1 | 9/2003 | Stuckman et al. |
| 6,646,570 B1 | 11/2003 | Yamada et al. |
| 6,654,594 B1 | 11/2003 | Hughes et al. |
| 6,668,169 B2 | 12/2003 | Burgan et al. |
| 6,766,017 B1 | 7/2004 | Yang et al. |
| 6,792,280 B1 | 9/2004 | Hori et al. |
| 6,795,703 B2 | 9/2004 | Takae et al. |
| 6,909,910 B2 | 6/2005 | Pappalardo et al. |
| 6,922,721 B1 | 7/2005 | Minborg et al. |
| 6,940,844 B2 | 9/2005 | Purkayastha et al. |
| 6,944,447 B2 | 9/2005 | Portman et al. |
| 6,954,754 B2 | 10/2005 | Peng |
| 6,970,698 B2 | 11/2005 | Majmundar et al. |
| 7,170,993 B2 | 1/2007 | Anderson et al. |
| 7,177,665 B2 | 2/2007 | Ishigaki et al. |
| 7,194,257 B2 | 3/2007 | House et al. |
| 7,236,166 B2 | 6/2007 | Zinniel et al. |
| 7,295,836 B2 | 11/2007 | Yach et al. |
| 7,353,016 B2 | 4/2008 | Roundtree et al. |
| 7,359,706 B2 | 4/2008 | Zhao |
| 7,539,484 B2 | 5/2009 | Roundtree |
| 7,558,965 B2 | 7/2009 | Wheeler et al. |
| 7,660,870 B2 | 2/2010 | Vandermeijden et al. |
| 2002/0065109 A1 | 5/2002 | Mansikkaniemi et al. |
| 2002/0112172 A1 | 8/2002 | Simmons |
| 2002/0115476 A1 | 8/2002 | Padawer et al. |
| 2002/0155476 A1 | 10/2002 | Pourmand et al. |
| 2003/0039948 A1 | 2/2003 | Donahue |
| 2003/0112931 A1 | 6/2003 | Brown et al. |
| 2003/0187650 A1 | 10/2003 | Moore et al. |
| 2003/0204725 A1 | 10/2003 | Itoi et al. |
| 2003/0233461 A1 | 12/2003 | Mariblanca-Nieves et al. |
| 2004/0142720 A1 | 7/2004 | Smethers |
| 2004/0171375 A1 | 9/2004 | Chow-Toun |
| 2004/0172561 A1 | 9/2004 | Iga |
| 2004/0193444 A1 | 9/2004 | Hufford et al. |
| 2006/0003758 A1 | 1/2006 | Bishop et al. |
| 2006/0158436 A1 | 7/2006 | LaPointe et al. |
| 2006/0168303 A1 | 7/2006 | Oyama et al. |
| 2006/0245391 A1 | 11/2006 | Vaidya et al. |
| 2006/0274869 A1 | 12/2006 | Morse |
| 2007/0019563 A1 | 1/2007 | Ramachandran et al. |
| 2007/0061243 A1 | 3/2007 | Ramer et al. |
| 2007/0064743 A1 | 3/2007 | Bettis et al. |
| 2007/0293199 A1 | 12/2007 | Roundtree et al. |
| 2007/0293200 A1 | 12/2007 | Roundtree et al. |
| 2008/0189550 A1 | 8/2008 | Roundtree |
| 2008/0194296 A1 | 8/2008 | Roundtree |
| 2008/0256447 A1 | 10/2008 | Roundtree et al. |
| 2008/0280588 A1 | 11/2008 | Roundtree et al. |
| 2009/0124271 A1 | 5/2009 | Roundtree et al. |
| 2009/0254912 A1 | 10/2009 | Roundtree et al. |
| 2010/0056114 A1 | 3/2010 | Roundtree et al. |

FOREIGN PATENT DOCUMENTS

| | | |
|---|---|---|
| CN | 1283341 A | 2/2001 |
| CN | 2478292 | 2/2002 |
| CN | 1361995 A | 7/2002 |
| CN | 1611087 A | 4/2005 |
| EP | 1387241 A2 | 2/2004 |
| GB | 2340344 A | 2/2000 |
| GB | 2365711 A | 2/2002 |
| JP | 10084404 A | 3/1998 |
| JP | 11259199 A | 9/1999 |
| JP | 2003067334 A | 3/2003 |
| JP | 2004021580 A | 1/2004 |
| WO | WO-9707641 A1 | 2/1997 |
| WO | WO-0070888 A2 | 11/2000 |
| WO | WO-0186472 A1 | 11/2001 |
| WO | WO-2005081852 A2 | 9/2005 |
| WO | WO-2005083996 A1 | 9/2005 |
| WO | WO-2007002499 A2 | 1/2007 |
| WO | WO-2007044972 A2 | 4/2007 |
| WO | WO-2007070837 A2 | 6/2007 |
| WO | WO-2007092908 A2 | 8/2007 |
| WO | WO-2008042989 A2 | 4/2008 |
| WO | WO-2008086320 A1 | 7/2008 |
| WO | WO-2008128119 A1 | 10/2008 |

OTHER PUBLICATIONS

U.S. Appl. No. 12/446,221, filed Jan. 6, 2010, Roundtree.
U.S. Appl. No. 12/521,989, filed Jul. 1, 2009, Roundtree.
U.S. Appl. No. 12/522,901, filed Jul. 10, 2001, Roundtree.
U.S. Appl. No. 12/595,803, Roundtree et al.
U.S. Appl. No. 12/720,624, filed Mar. 9, 2010, Roundtree et al.
3rd Generation Partnership Project. "Specification of the SIM Application Toolkit for the Subscriber Identity Module—MobileEquipment (SIM-ME) Interface (Release 1999)," 3GPPOrganizational Partners, 2004, 143 pages.
Center for Customer Driven Quality at Purdue University, "It's the Solution, Stupid," 2004, 2 pages.
Gartner, "Contact Center Investment Strategy and Leading Edge Technologies,"http://www.gartner.com/4_decision_tools/measurement/measure_it_articles/200_2_12/contact_center_investment_strategy_jsp, accessed on Jul. 8, 2008, 4 pages.
SNAPin Software Inc., "SNAPin White Paper: The Service Experience Opportunity," <http://www.snapin.com>, 2005, 16 pages.

* cited by examiner

METHOD FOR PERFORMING INTERACTIVE SERVICES ON A MOBILE DEVICE, SUCH AS TIME OR LOCATION INITIATED INTERACTIVE SERVICES

CROSS-REFERENCE TO RELATED APPLICATION(S)

This application is a continuation of PCT Application No. PCT/US2006062047, filed Dec. 13, 2006, which claims the benefit of U.S. Provisional Patent Application No. 60/749,854, filed Dec. 13, 2005, entitled METHOD FOR PERFORMING INTERACTIVE SERVICES ON A MOBILE DEVICE, SUCH AS TIME OR LOCATION INITIATED INTERACTIVE SERVICES and U.S. Provisional Patent Application No. 60/849,390, filed Oct. 3, 2006, entitled SIM BASED METHODS, SUCH AS REMOTE LOGISTICS MANAGEMENT AND CONFIGURATION USING SIM BASED APPLICATIONS, each of which is hereby incorporated by reference in its entirety.

BACKGROUND

Current methods for providing services to users of mobile devices are often misguided as they do not meet users' needs and wants. For example, some service providers send advertising to their users via broadcast text messaging, where the advertising is not targeted to an y particular users and instead is sent to all users without regard for their interests.

Additionally, problems are associated with providing such services to users in a timely and/or topical manner. Users may receive content from a source, but will have little or no use for the content, and ignore the content.

These and other problems exist with respect to providing interactive services to users of mobile devices.

BRIEF DESCRIPTION OF THE DRAWINGS

FIG. 7 is an example of a mobile device display screen depicting an "in-bound call" directed to a subscriber.

FIG. 8 is an example of a mobile device display screen depicting the display of interactive services to a subscriber after the subscriber accepts the "in-bound call" of FIG. 7.

Figure 1:
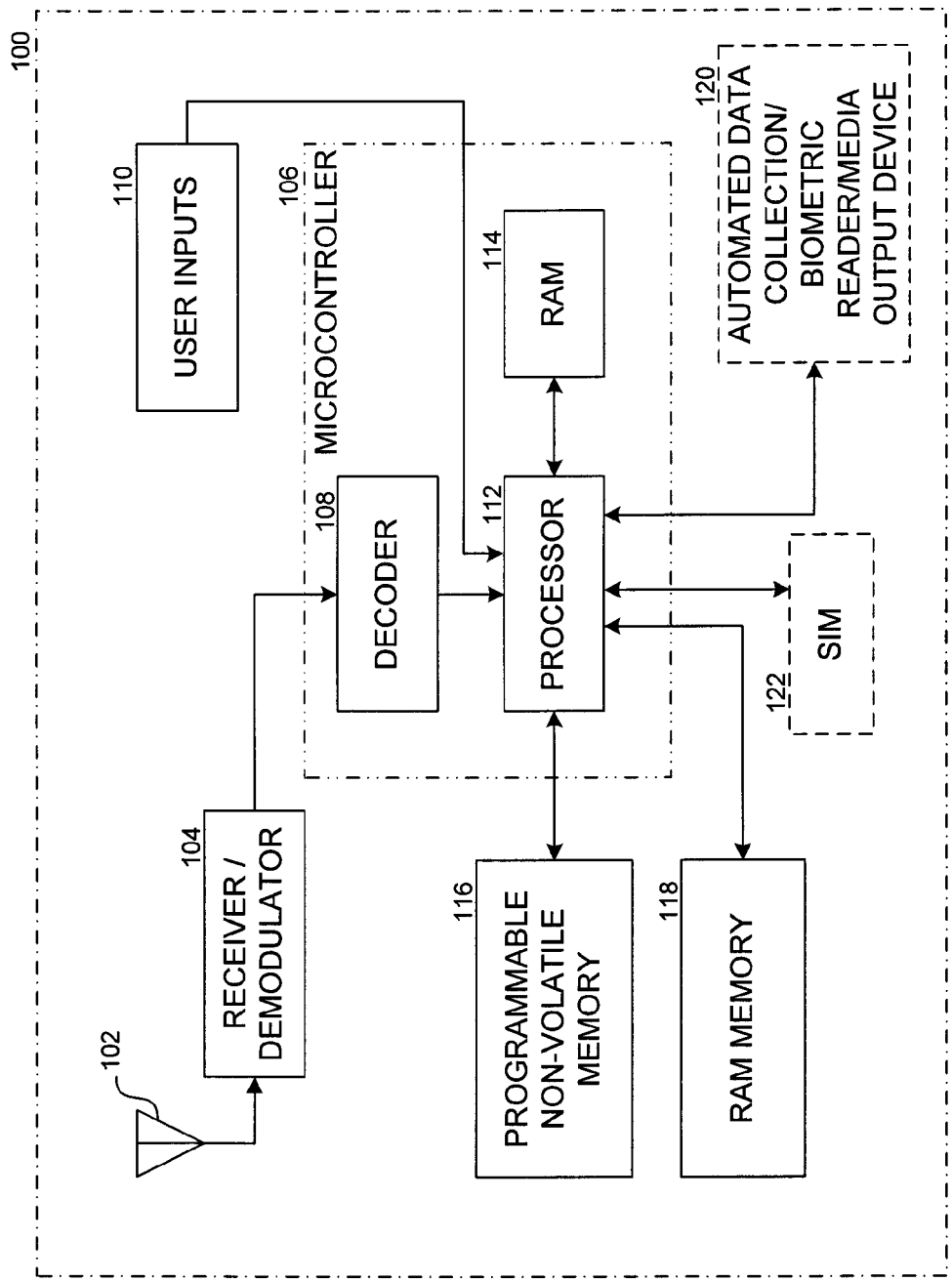
FIG. 1 is a schematic diagram illustrating a mobile device on which call intercept methods and customer self-support can be implemented.

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

A portion of this disclosure contains material to which a claim for copyright is made. The copyright owner has no objection to the facsimile reproduction by anyone of the patent document or patent disclosure (including the Figures) as it appears in the Patent and Trademark Office patent file or records, but the copyright owner reserves all other copyright rights whatsoever.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented below be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

A method and system for providing interactive services to a user will now be described. In some cases, the system simulates an in-bound call to a user of a mobile device, and provides an interactive display during the call. In some cases, the system triggers an interactive package of services to be presented to a user when the system reaches a pre-determined event or time.

In some cases, the system enhances the experience of answering a phone call by providing visual and/or other interactions for the user. For example, the system may, upon a triggering of a script-based process due to a pre-determined occurrence of an event, simulate an inbound call to a user at his/her mobile device. The user may receive the call (such as by pressing "answer" or "send" on the handset of the mobile device), and the system may present the user with an interactive display of services, such as a web page displaying content to the user.

Suitable System

FIG. 1 illustrates a mobile device 100 on which interactive services can be implemented in accordance with several embodiments of the technology. A receiver/demodulator 104 receives a transmitted signal via an antenna 102 and reconstructs the original transmitted signal. The transmitted signal is sent to a microcontroller 106, which consists of a decoder 108, a processor 112, and RAM (Random Access Memory) 114. The decoder 108 translates the signals into meaningful data and interfaces to other devices. Decoded data, along with subscriber inputs 110, are sent to the processor 112. In addition, the mobile device may include optional components, such as an automated data collection 120 unit linked to the processor 112, which can include an automated RFID (Radio Frequency Identification) tag reader, a magnetic card swipe reader, a bar code reader, and others. Additionally, or alternatively, the mobile device may include a biometric reader (e.g., thumbprint reader, voice fingerprint recognition functionality, etc.), and/or a media output device (e.g., MP3 player, television tuner/player, etc.) 120. The mobile device may also include a subscriber identity module (SIM) 122, such as a SIM or Universal Integrated Circuit Card (UICC) capable of running and/or storing scripts and other applications within the SIM or UICC. The output of the processor 112 can be stored in a programmable non-volatile memory 116 or in the RAM memory 118.

Figure 2:
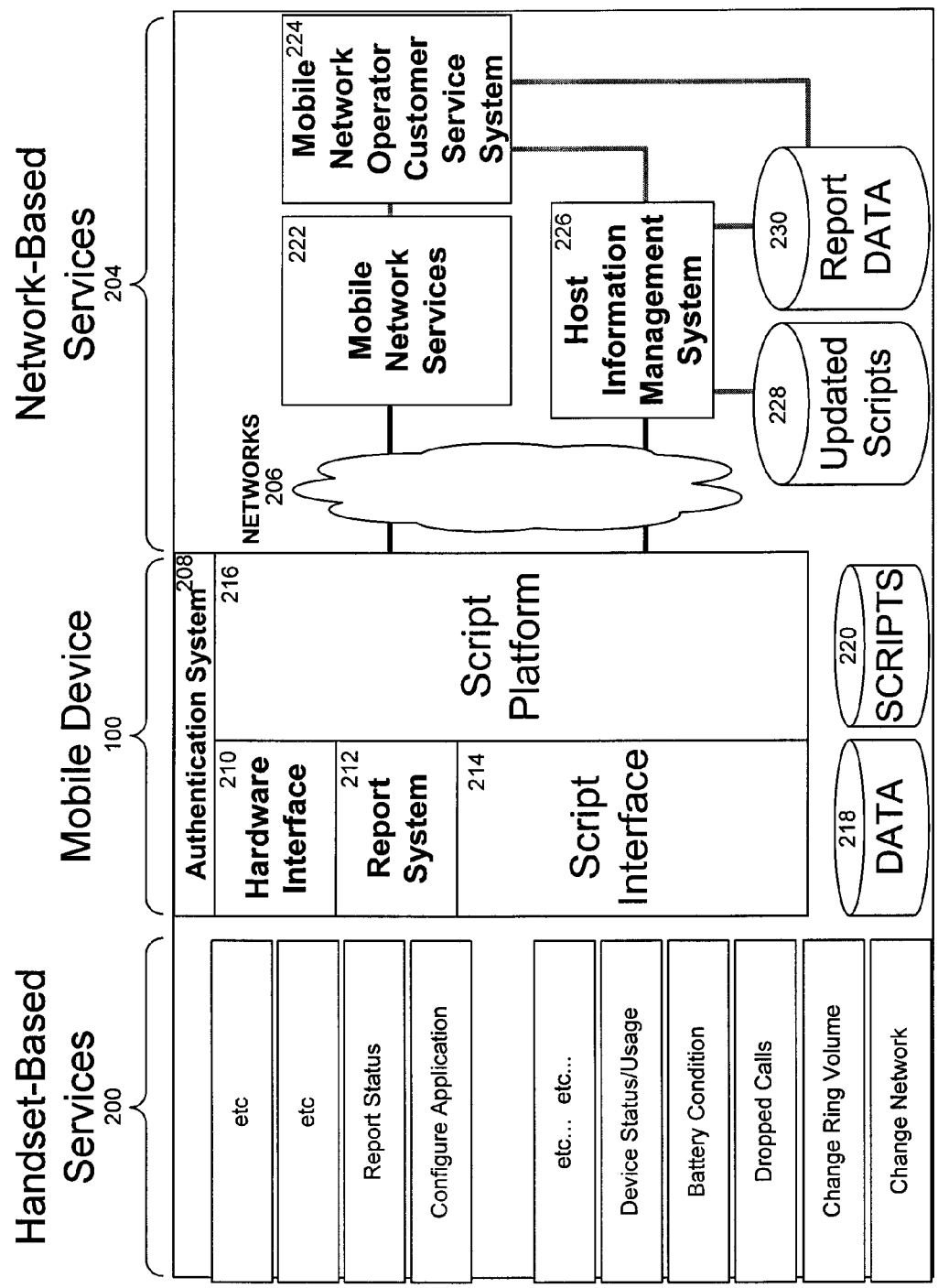
FIG. 2 is a schematic diagram illustrating a system architecture for implementing call intercept methods and customer self-support.

FIG. 2 illustrates a system architecture for implementing interactive services. The system architecture includes three components: handset-based services 200, the mobile device 100, and network-based services 204. FIG. 1 and the discussion herein provide a brief, general description of a suitable telecommunications or computing environment in which the invention can be implemented. Although not required, aspects of the invention are described in the general context of computer-executable instructions, such as routines executed by a general-purpose computer, e.g., mobile device, a server computer, or personal computer. Those skilled in the relevant art will appreciate that the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the invention can be embodied in a special purpose computing device or data processor that is specifically programmed, configured, or constructed to perform one or more of the computer-executable instructions explained in detail herein. Aspects of the invention may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network. In an alternative embodiment, the mobile device or portable device may represent the server portion, while the server may represent the client portion.

The handset-based services 200 may include executable software, software configurations, hardware configurations and controls, and handset operating system interfaces. As disclosed herein, executable software may include, without limitation, any software program stored on the mobile device, associated memory device, associated SIM or UICC, and so on, both permanently and temporarily connected via hardware or wireless connectivity. The mobile device 100 may include an authentication system 208 (e.g., via a SIM), a hardware interface 210, a report system 212, a script interface 214, a script platform 216, data 218, and scripts 220. The network-based services 204 may include a network or networks 206, mobile network services 222, a mobile network operator customer service system 224, a host information management system 226, updated scripts 228, and report data 230. The components of the mobile device 100 and the network-based services 204 will be described below.

The components within the mobile device 100 allow the device to integrate both handset-based services 200 and network-based services 204. The authentication system 208 can implement SIM (Subscriber Identity Module) card-based or standalone authentication to meet network requirements for desired levels of security. Authenticating a system to meet network requirements may not be required but is often recommended.

The hardware interface 210 may retrieve hardware interface elements required for interfacing with network or phone-based customer support services. Examples of hardware interface elements include changing volume, changing frequency, retrieving SIM (Subscriber Identity Module) ID, connection status from the SIM or radio hardware, and others. The report system 212 may collect and forward the data reported by the mobile device to the network 206. The report system 212 can also encrypt the handset identification information to provide increased security. The information can be encoded so that only the host information management system 226 can decipher the handset identification information.

The script interface 214 serves as a standard application programming interface for interactive services. More specifically, the script interface 214 provides an interface between scripts 220 and the various hardware-specific and executable, program-specific functions (such as action components capable of performing actions on the mobile device). The script interface 214 allows a single customer service script to be deployed across multiple operating systems and hardware configurations. In addition, the script interface 214 includes a standard API (Application Programming Interface) for both the hardware/OS side and the script interface.

The script platform 216 can mix and match calls through the script interface to acquire information, to change or correct settings on the phone, and to perform additional functions as described below. The script platform 216 authenticates, runs, and updates all scripts 220, manages reporting updates and changes, communicates with the host information management system 226, communicates with the GUI (Graphical User Interface), and manages customer surveys and interviews. The host information management system 226 can push a notification to the script platform 216 via USSD (Unstructured Supplementary Services Data), SMS (Short Message Service), IP (Internet Protocol), or any other network connectivity that the mobile device supports. The script platform 216 can run the scripts 220 after authentication, and the scripts 220 can be authenticated to the network 206 or to the phone.

The components within the network-based services 204 allow the mobile device 100 to communicate with and to retrieve data from the network 206. The network-based services 204 may include wired and wireless systems. The mobile network services 222 may consist of one or more systems including billing, CRM (Customer Relationship Management), provisioning, and others. Furthermore, mobile network services 222 are able to return data calls made by mobile devices via standard network protocols (e.g., IP, DTMF (Dual-Tone Multi-Frequency), SMS, USSD, etc.).

The mobile network operator customer service and interactive system 224 may also consist of one or more systems relating to customer service, including billing, CRM, provisioning, and others. The host information management system 226 controls interactions between the mobile device and the host customer support system. The host information management system 226 can transmit updates to the mobile device. The mobile device typically employs a unique handset ID or serial number, and a mobile phone number. The report data 230 provides storage for report information gathered from the mobile device. The updated scripts 228 consist of scripts that the host customer support system provides to the mobile device. The updated scripts 228 can be managed and versioned as desired by the host information management system 226, can be targeted at specific subscribers or groups of subscribers, and can include requests for reports and customer interview surveys.

Figure 3:
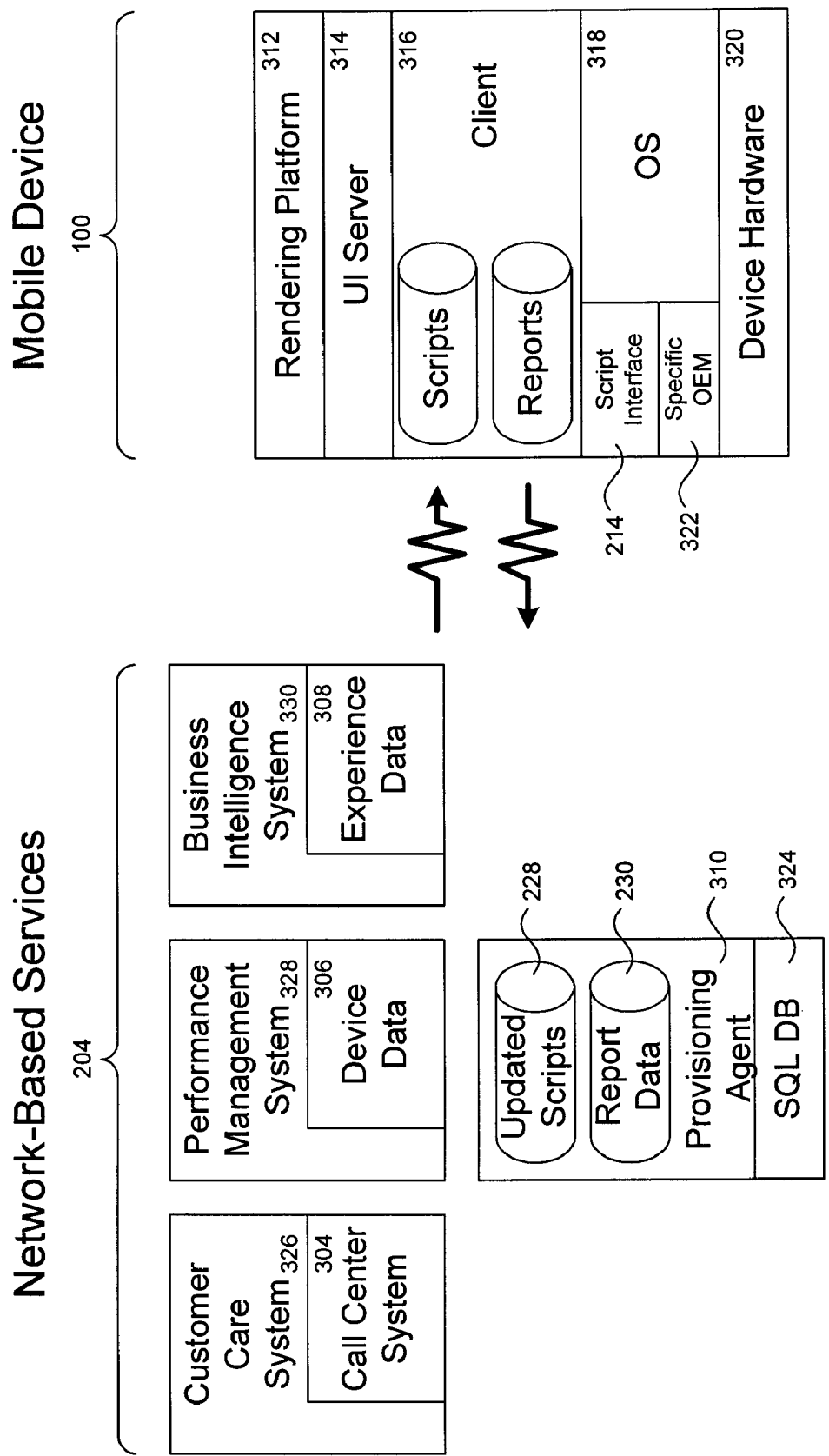
FIG. 3 is a schematic diagram illustrating a system architecture for the network-based services and the mobile device of FIG. 2.

FIG. 3 illustrates a system architecture for the network-based services 204 and the mobile device 100. The network-based services 204 include a call center system 304, device data 306, subscriber experience data 308, and a provisioning agent 310. The call center system 304 may be part of a customer care system 326, the device data 306 may be part of a performance management system 328, and the subscriber experience data 308 may be part of a business intelligence system 330. The call center system 304 can manage settings remotely and can collect data OTA (over the air) from the mobile device 100 without asking the subscriber for permission. The call center system 304 can also automatically collect device data (e.g., handset ID and mobile phone number) 306 and subscriber experience data (e.g., the nature of the customer service problems or types of interactive services) 308 from the mobile device 100. The device data 306 and the subscriber experience data 308 may be integrated into network-based services or used standalone.

The provisioning agent 310 interacts with the updated scripts 228 and report data 230. The provisioning agent collects report data 230 associated with the device data 306 and subscriber experience data 308 from the mobile device 100. The provisioning agent also corrects subscriber problems in real-time by transmitting appropriate scripts to the mobile device 100. The transmission of scripts to, and the collection of data from, the mobile device 100 may be hosted within the network or externally. In addition, the updated scripts 228 and the report data 306 may be stored in an SQL (Structured Query Language) database 324.

The mobile device 100 may include a rendering platform 312 (e.g., implemented in C++), an optional UI (User Interface) server 314, a client 316, and a script interface 214. The client 316 generates reports containing subscriber data and transmits the reports to the network-based services 204. The client 316 receives scripts 320 from the network-based services 204 that can correct subscriber problems. The script interface 214 allows a single script to be executed by multiple operating systems and hardware configurations. In addition, the mobile device 100 may also include an OS (Operating System) 318, specific OEM (Original Equipment Manufacturer) 322, and device hardware 320. In general, the mobile device scripts or applications may be customized via a European Computer Manufacture's Association (ECMA) compliant scripting language such as JavaScript. Such software can be installed by the manufacturer, or after manufacturing, such as over the air, particularly with open OS-based devices. For proprietary OS-based devices, a small kernel can be installed at the time of manufacturing or flashed onto the device at a later time, and then the full client application can be installed on the mobile device over the air.

As explained herein, the scripts or software applications on the mobile device provide for at least four processes: providing customer care to a subscriber on the mobile device by intercepting calls; diagnostic tools to allow customer service representatives to remotely execute diagnostics and commands on the mobile device, with proactive tool to correct problems for subscribers on the mobile device; collecting and summarizing data and other metrics with respect to mobile devices; and, guides to train subscribers when they need it most, such as the first time they attempt to use an application.

Figure 4:
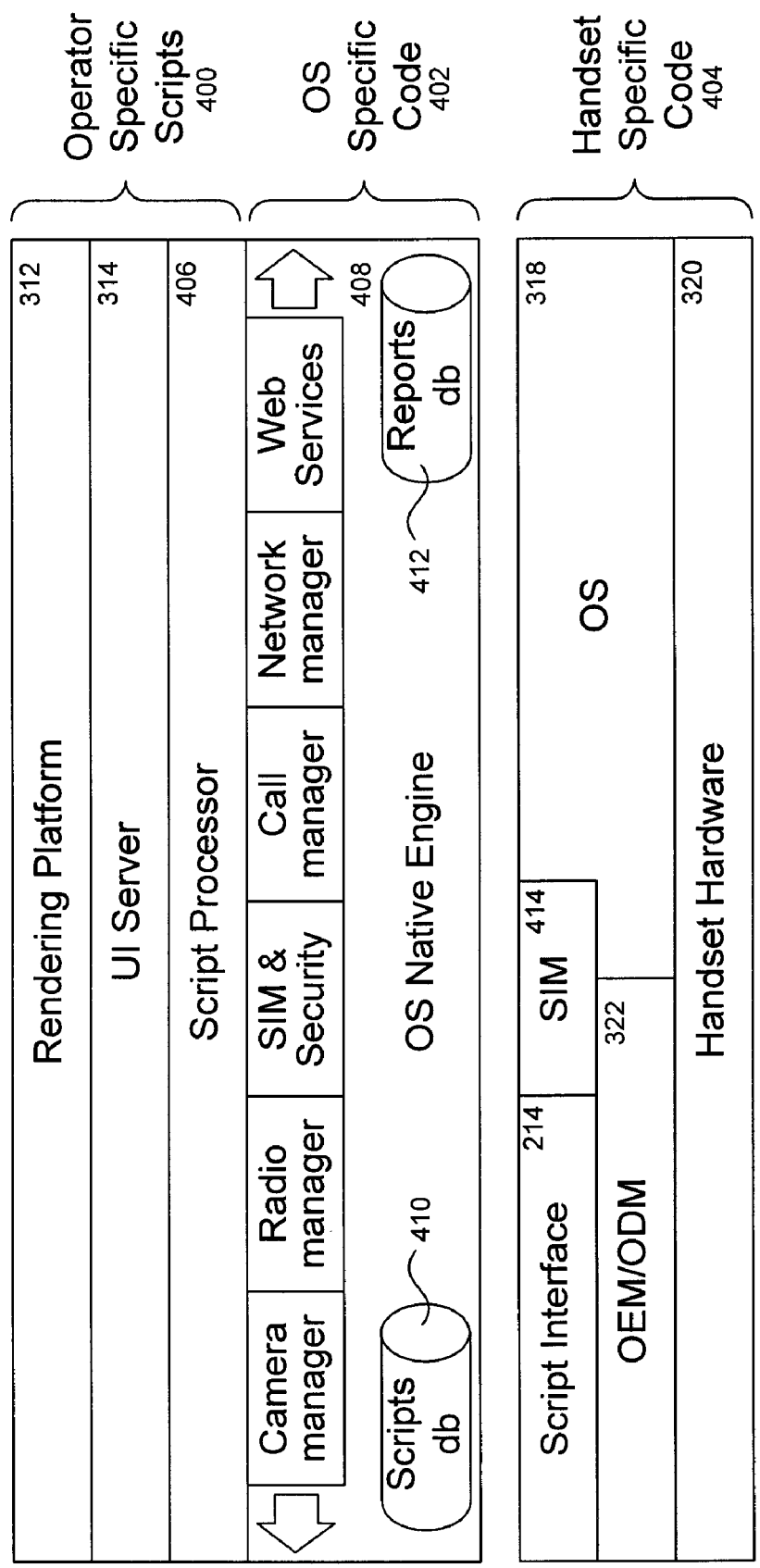
FIG. 4 is a schematic diagram illustrating the architecture for the mobile device of FIG. 1.

FIG. 4 illustrates the architecture for the mobile device 100. The rendering platform 312, the UI server 314, and a script processor 406 handle or are involved in handling operator specific scripts 400. Operator specific scripts 400 may include scripts pertaining to billing information, bill payment, forwarding calls, setting up an online photo album, and others, including those specific to a wireless service provider (such as those providing a preferred user interface). The OS native engine 408, which includes a scripts database 410 and a reports database 412, utilizes OS specific code 402. The script interface 214 utilizes handset specific code 404. Handset specific code 404 may also be applied to a SIM 414, an OS 318, specific OEM 322, and handset hardware 320.

Figure 5:
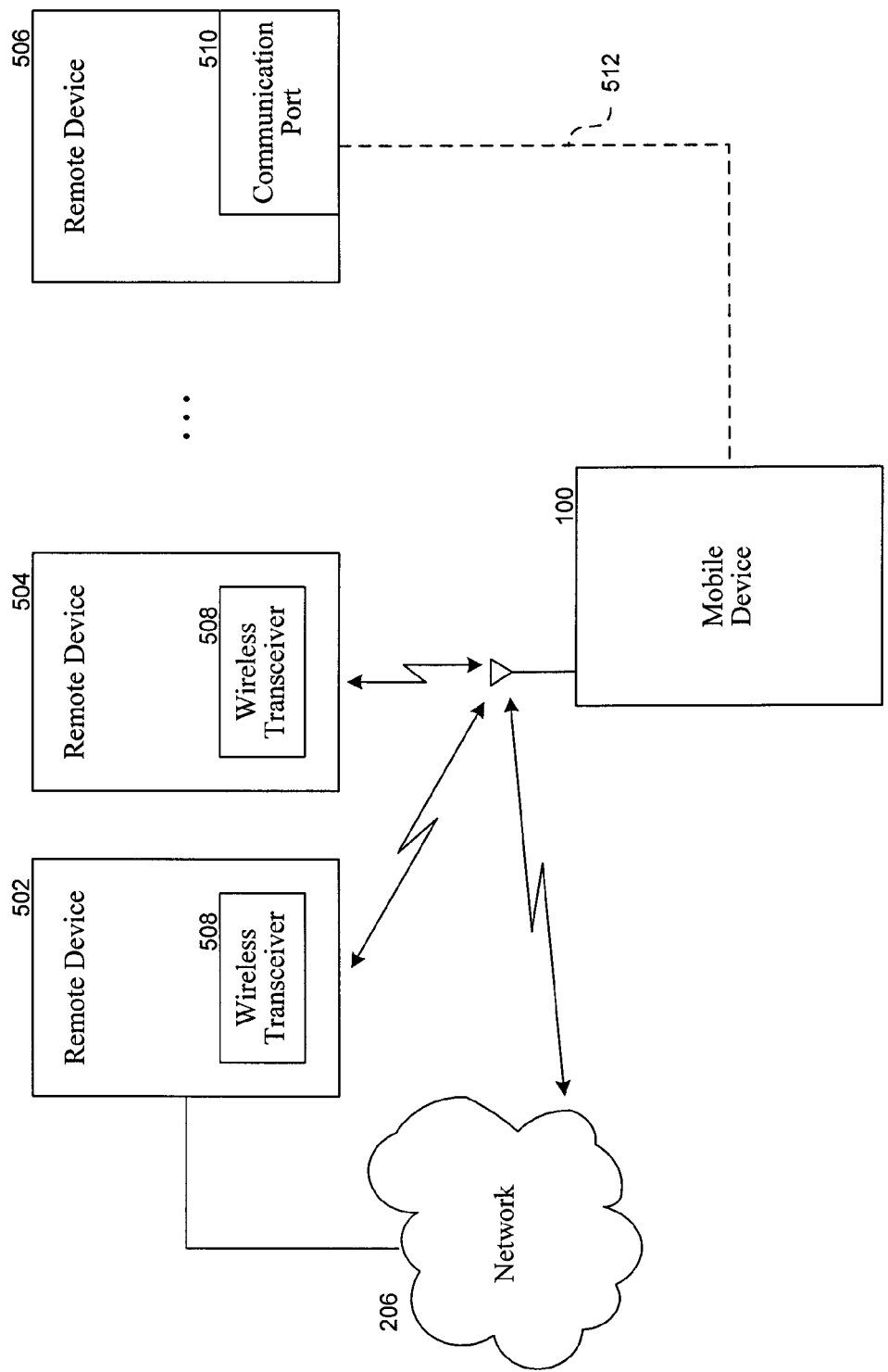
FIG. 5 is a block diagram illustrating an alternative embodiment where the mobile device communicates with remote devices.

Referring to FIG. 5, an example of an alternative embodiment is shown where the mobile device 100 communicates with multiple remote devices 502, 504, and 506. Remote devices 502 and 504 each include a wireless transceiver 508 that communicates with the mobile device 100, such as via a Bluetooth link, IEEE 802.11, or other short-range wireless link. The mobile device may communicate with the remote device 506 via a wired communication port 510 that the mobile device can be physically coupled to at the subscriber's option. (As also shown, the remote device 502 includes a wired connection to the network 206.) Thus, the mobile device may be a central communicator within a subscriber's home or other location, where the mobile device receives alerts from the remote devices, provides instructions or steps to the subscriber, allows the subscriber to query a status of remote devices, allows the subscriber to send commands to or operate the remote devices, and so forth. While a local wireless link is described above, the mobile device may be capable of remotely querying and controlling the remote devices via other connections, such as via the network 206 to control the remote device 502, or via a longer range wireless link, such as a WAN, satellite link, and so forth.

The system may also provide support from a network server to the mobile device. The mobile device may include a STK (SIM application toolkit) for driving the interface and the exchange of data between the mobile device and the network server. The STK may search for relevant support pages in response to a data request from the mobile device application. The relevant support pages may be stored in a support page database on the network server. The relevant support pages may be pushed to the mobile device via SMS, USSD, or other methods. An STK application handler on the mobile device opens the support pages using a browser. In addition, additional support pages may be retrieved remotely from the network server and opened using the STK application handler. Support pages from the network server may also be stored locally on the mobile device. These support pages provide data or instructions as described herein, such as during the display of interactive services.

In an alternative embodiment, the SIM/USIM (Universal Subscriber Identity Module) on the mobile device may be used to provide scripts and the processing of scripts when determining events or occurrences at the mobile device. In some cases, a 3GPP TS 11.14 compliant (or similar) SIM or USIM to process and/or invoke scripts used to generated displays, pages, and other interactions.

Providing Interactive Services

The system may provide interactive services to a subscriber, such as time-based or event-based interactive services. For example, a subscriber's mobile device may be set up to optionally display certain interactive content, periodically or sporadically, such as at a defined date and/or time. When the defined date and/or time are reached, the system initiates a process that may provide the interactive content. The system may invoke a script causing the mobile device to connect to an associated network to access information. This information may then cause the script to process local decisions at the mobile device, such as locally displaying information to the subscriber on the mobile device if certain conditions are met.

For example, the system may check the current location of the subscriber to see if it is appropriate to contact them, it may check a user-contact preferences database to see if the time or other customer conditions for contact are appropriate, it may check to verify the local presence of a (customer or vendor) specific RFID device(s) by type classification or specific devices identifiers, it may check to see what kind of network and bandwidth is locally available, in case a broadband network is required for streaming data (such as a video of a scheduled sports match), and so on.

Furthermore, the system may check to see if a user (or subscriber) is a customer of the vendor (via a network) that wishes to be notified of certain special offers from a vendor and then change script mode to begin monitoring for a particular group of radio identifications (such as available via RFID technology, Bluetooth technology, WIFI, and so on) that could be associated with a business store front, so a subscriber may be notified with special information when they are near the vendor's store front (which benefits a user in that privacy information may not have to be shared, the vendor may not require any knowledge of the user's presence, all location information may be consumed locally within the mobile device.

Also, a certain time (and/or date) may put the device into a special mode and the system may ask (or prompt) the user to adopt one or more special modes for the device. For example, the device may be set to switch into the special mode of a "sports mode," when, at a certain time (such as once every week) and for a certain duration (such as for three hours) the device may begin monitoring certain short messages. Additionally, the special mode (in this case the sports mode) may activate certain device network capabilities (that may have been turned off, e.g., to increase battery life) such as WIFI (where the networking parameters may be in the script based on user and device capabilities), where the primary goal may be to have the device ready to immediately play content to the user.

The system may also provide the ability to turn on or off specific radios on the mobile device, or other functionalities or applications. For example, a special mode would be to assume a particular WIFI radio status of being OFF during the hours of 8 P.M. and 6 A.M. (the device's time) and/or while the device is wirelessly attached (or was last attached) to a specific group of cell towers (e.g., by GSM cell ID). In this example, WIFI radios on the device may be turned off at night while the user is at home and not expecting to use the device.

Furthermore, the system may check with the network time (and/or date), in case there is a discrepancy between the time (and/or date) of the device and the network. The discrepancy between network time and device time may be used as a variable to adjust an event time. For example, a target event time on a device may be 9 A.M. and the device's time shows 9 A.M. but the network's time is found to be 6 A.M. In this case, the target event meant to initiate on the mobile device may be temporarily modified to initiate the event at 12 P.M. (the corrected time) without changing the device's clock. Local country identifiers from the mobile network may also be used to modify the initiation of events on the mobile device. For example, a user traveling to another time zone will not receive a call (and thus be awoken at their mobile device's time of 5 A.M.) with a request to pay their utility bill. Instead the scripted system may correct the time so that the user is not contacted until a later local time (such as 9 A.M.), which may be the originally intended time in the user's home.

Additionally, the system may, based on a command implied or included in a text message (or IM, or email, or calendar event), turn a WIFI or Bluetooth radio either on or off, or attach to a specific access point. Also, the system may use text messages to set up additional events, launching local scripts that may monitor various communication channels (such as IM and SMS channels) that may provide additional triggers to be monitored.

Figure 6:
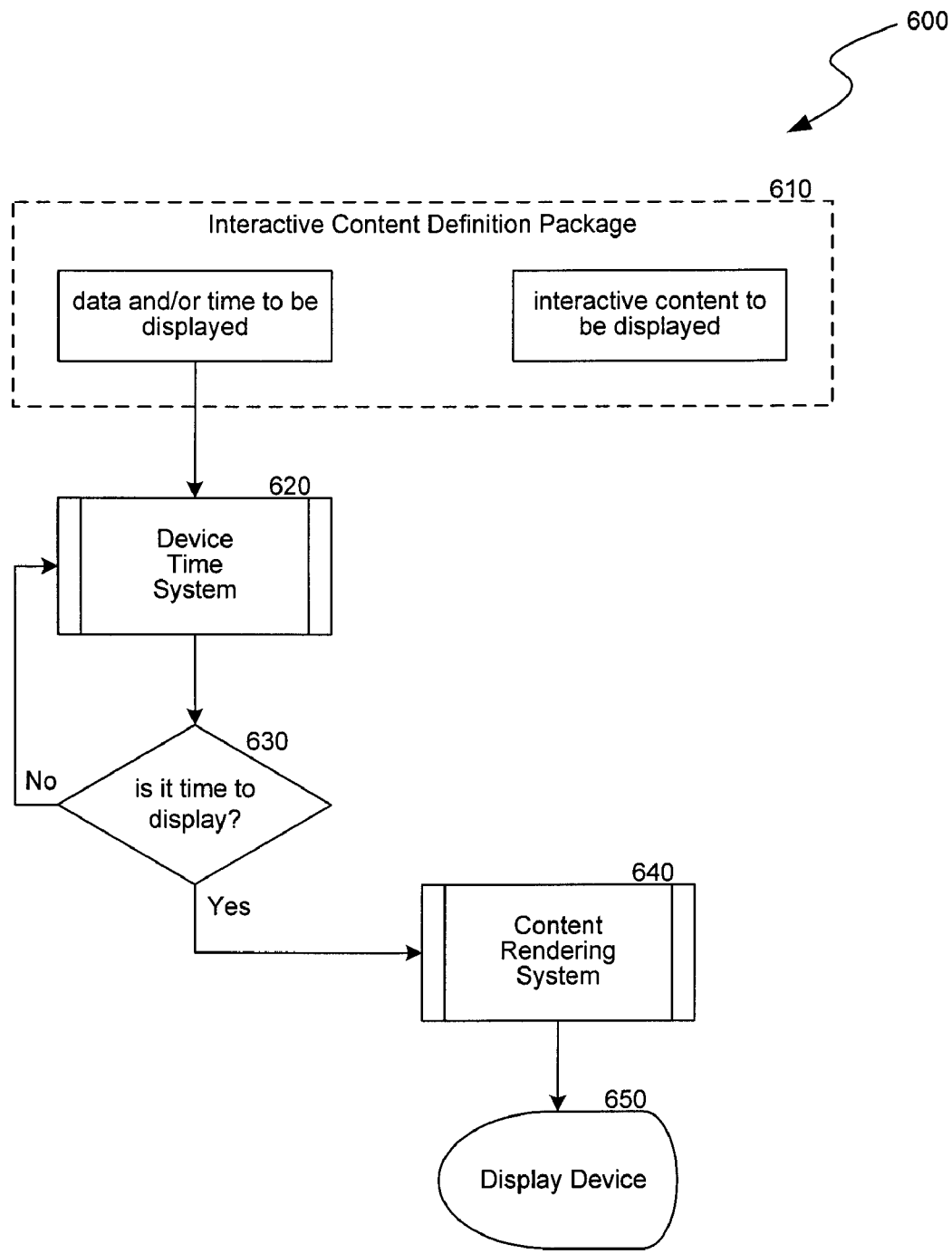
FIG. 6 illustrates an example of a process flow for performing interactive services on mobile devices.

FIG. 6 is an example of a process flow 600 illustrating interactive time-based services provided to a subscriber. An interactive content definition package 610 located within the mobile device or at a remote location and accessed through a network, accesses the system's (e.g. the mobile device's) date and time, shown in block 620. When a pre-determined date and time is reached 630, the system may invoke a content rendering system 640 that interacts with package 610 that may cause the system to display the interactive content to the subscriber via the mobile device's display 650. For example, at a specified time and date, the content rendering system will in the background connect with the package 610 and trigger the mobile device to simulate an "in-bound call" directed to the subscriber. For example, the mobile device may simulate a voice call directed to the subscriber, a text message to the subscriber, an email message to the subscriber, and so on (all of which are defined herein as a "cal"). Alternatively, before simulating the call, the mobile device may contact a remote server to determine whether to proceed next, e.g. determine whether the subscriber is late in making payments, such as payments to a public utility. When the subscriber accepts the call, the content rendering system 640 may then access interactive content from the package 610 and display it to the subscriber. The displayed content may include information pulled from a remote server, such as status of the subscriber's accounts.

Additionally, the content rendering system 640 may alert a subscriber of content in other ways, such as sending event related announcements (e.g., playing "Scoooooore!" to announce action(s) at a sporting event), displaying visual animation (where sound is not played to the subscriber), sending company jingles or animation, using vibration or other quiet notifications, and so on. Also, the system 640 may network to other devices (such as televisions, appliances, computers, and so on), via RFID, Bluetooth, WIFI or other local radio networks, and perform certain functions (such as make a cup of coffee at a certain time at a networked coffee maker).

FIGS. 7 and 8 are mobile device display screens 700 depicting an "in-bound call" directed to a subscriber to provide interactive services on the subscriber's mobile device display 710. Screens 700 (and other screen displays), representative phone or computer displays, or web pages, are shown for performing certain tasks described herein. The screens provide facilities to receive input data, such as a form with field(s) to be filled in, menu selections, pull-down menus or entries allowing one or more of several options to be selected, buttons, sliders, hypertext links or other known user interface tools for receiving user input. While certain ways of displaying information to users is shown and described with respect to certain Figures, those skilled in the relevant art will recognize that various other alternatives may be employed. The terms "screen," "web page" and "page" are generally used interchangeably herein.

The screens may be stored as display descriptions, graphical user interfaces, or other methods of depicting information on a computer screen (e.g., commands, links, fonts, colors, layout, sizes and relative positions, and the like), where the layout and information or content to be displayed on the page is stored in a database. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), Flash format, or matrix or bit-mapped formats.

Upon initiation of the content (such as by reaching a predetermined date and time), the system may play a ring-tone 720 or provide other signals (vibration, visual signals, and so on) alerting the subscriber of the content to be displayed. In some cases, the system will pretend or mimic an in-bound call, and alert the subscriber similarly. In this way, the system may stimulate a user or subscriber with known functions of the mobile device, such as familiar ring tones or alerts when the device receives a voice call, an SMS, an email, and so on. The user may be more receptive to known stimuli, and receive the content.

If the subscriber accepts the "in-bound call," either by pressing a "send" button 730 or any other button capable of accepting calls, the system may play a message informing the subscriber that interactive content is to be displayed. For example, upon hearing a normal ring-tone, a subscriber may see that "City Gas" is calling (screen 720), press a "send" button 730 on his or her mobile phone, and hear a message such as "Welcome to City Gas services, please look at your display now." The system may then provide an interactive content screen 820 to the subscriber via the mobile device's display. For example, the system may "call" the subscriber once a month to provide interactive content allowing the subscriber to pay his or her bill 830. The interactive content, as shown in FIG. 8, may be the subscriber's account information 840, billing statement information, interactive buttons 850 allowing the customer to pay a bill or perform other account management functions, and so on.

If the subscriber does not accept the "in-bound call," either by rejecting the call or not answering, the system may reschedule the event to another date and time based on preset definitions located at the mobile device or retrieved from a remote network based resource.

Alternatively or additionally, the subscriber may request to decline certain event initiated content using this methodology. The system may then query the user for a preferred method and perform follow-up configuration or scheduling of remote services according to the subscriber's preferences. For example, the user may decline an "in-bound call" and additionally ask to not be contacted in the same manner again. The system may then ask the subscriber if they prefer to be notified only in certain locations, prefer other methods such as email or voice, or prefer only to be contacted within range (such as via RFID) of a particular piece of equipment during certain hours (like business hours). As an example of the latter case, the system may contact a subscriber at 7 P.M. when an office copier is low on toner, and initiate an alert text message that may start an interaction with the subscriber. The subscriber may decline the interaction and, upon being asked by the system for preferences, may request to be contacted between working hours and when located a certain distance from the RFID of the copy machine.

Although a certain date and time may trigger the system to perform the above functions, one of ordinary skill will realize that other events may trigger the system to carry out similar aspects of the technology. For example, the system may invoke the process when a subscriber's bill is past due, when a subscriber's minutes are low, when a subscriber owes a certain amount of money, before a subscriber's account is over (and may prompt a subscriber to renew the account), and so on. Also, in some examples, the subscriber may determine when to receive such "in-bound calls." For example, the subscriber may wish to receive interactive content after pre-selected sporting events are completed, after stock markets close, a week before a bill is due, and so on.

The system may also use a subscriber's calendar items as events, and combine these events with vendor's catalogs or other content. For example, a week before a calendar item containing a key word such as "birthday" may be considered an event, and the system may trigger catalogs of certain gift vendors (those who arrange to have scripts loaded on a subscriber's device and linked to that keyword) to display to the subscriber. In this example, the subscriber may then interact with the scripts and select certain services or products, which the system may access via external connections. The system may perform immediate or faster interactions (such as connecting to video streams) if an event warrants such an interaction.

Because a vendor is only contacted when outbound connections are made (such as when a subscriber decides to purchase a service), the system maintains the subscriber's privacy. Until the device makes an external connection, the system performs all actions locally within the device (scripts, interactions, and so on), allowing the subscriber the opportunity to look at services and products from many different vendors without the vendor's knowledge.

As discussed herein, events (such as time-based or location-based) may trigger the system to change the mode, the usability, the user interface, or the functionality of a mobile device. For example, the system may receive an indication that a user's subscription with their service provider ends in a month. Such an event may cause the device user interface to change to the latest user interface provided by the service provider, or provide new functions to the device. The new functions and user interface can improve the look or functionality of a user's phone, which could cause the user to delay purchasing a new phone. Similarly, an anniversary, birthday, or other personal event indicated on a user's calendar may trigger the system to update the user's GUI to show a picture of their loved one. Also, tasks may trigger additional reminders or mode changes. A user may pickup their child every day at 4 P.M., and the system may simulate a call from the child's mobile device shortly before 4 P.M. to remind the user of the pickup.

As can be seen, aspects of the invention permit a wireless service provider to move call support functions from a call center to the mobile device itself. The wireless service provider can monitor call center activities and identify those subscriber inquiries that currently consume the largest amount of call center time, and move such calls to be handled on the device itself (where appropriate). As noted above, many such customer support calls can be handled on the device, such as technical support questions, questions regarding whether a subscriber is eligible for a promotion, billing inquiries, and so forth. Thus, the customer self-support screens and functions stored locally on the mobile device, links or data displayed in an initial screen on the device (e.g., billing information), and so forth, can change dynamically, so that the wireless service provider updates the customer self-support features on the mobile device to accommodate those calls that currently consume the largest amount of call center time.

The interactive features are not limited to mobile devices, as noted above. Such features can apply to any remote device, including consumer appliances such as refrigerators, dishwashers, washers/dryers, ovens, and so forth. With any of such appliances having computing capabilities (and/or connection to the internet), such devices can locally store information and provide the functionality described above to handle customer inquiries that previously had been handled by a call center or web site accessed by the consumer via another device, such as the consumer's computer.

Thus, in an alternate embodiment, a mobile device may use a Bluetooth or other wireless protocol link to communicate with the household appliances. For example, a Bluetooth link between a refrigerator and a mobile device may allow the mobile device to automatically detect a drop in the temperature of the refrigerator. Upon automatic detection, the mobile device may alert the user regarding the drop in temperature. Using the mobile device as an interface, the user may find information to address the drop in temperature on the mobile device itself, may download information from a network, or may call a customer support center for the specific appliance.

Conclusion

As noted above, each remote device may include the customer self-support functionality described herein. Further, since some remote devices may lack a sufficient display screen or other user interface, the remote device may communicate with the mobile device so that the mobile device operates as a more robust user interface for that remote device. Thus, consumers may receive instruction screens from an appliance, and provide commands to that appliance, through the mobile device.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

Further, the mobile device may employ many other locally stored applications beyond those described above. For example, the mobile device may include its own IVR system, rather than employing an IVR system at the call center. Thus, the subscriber navigates through a series of IVR menus to access desired information, some of which may be stored on the phone. However, one option in the local IVR could be to have the device place a call to the customer support call center.

In another alternative embodiment, the system may provide links to web pages supplied by the wireless service provider, where these links are to specific web pages directly addressing a need or question relevant to a current status of a user's mobile device. Such an alternative is useful when a mobile device has a web browser and sufficient data connection to the service provider's web server. Thus, a call intercept function on the mobile device may provide a link to a relevant web page, or even access that page automatically so that it is displayed to the user (rather than, for example, displaying locally stored content).

While many embodiments described above employ software stored on the mobile device (either before being given to a subscriber, or during a subscriber call), the scripts and other software noted above may be hard coded into the mobile device (e.g. stored in EEPROM, PROM, etc.). Further, the above functionality may be implemented without scripts or other special modules.

The teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the local-based support system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

I claim:

1. A system in a mobile device, comprising:
   a scripts database, stored within the mobile device, that stores one or more scripts related to one or more actions to be performed for a user of the mobile device;
   an event sub-system, stored within the mobile device, that receives an indication of an occurrence of a previously established event, wherein the previously established event relates to a status of the mobile device independent of a status related to telecommunication functions of the mobile device;
   a scripts sub-system, stored within the mobile device, that selects a script from the one or more scripts stored in the scripts database of the mobile device in response to the received indication;
   an initiation sub-system, stored within the mobile device, that initiates the selected script; and
   a performance sub-system, stored within the mobile device, that performs an action of the one or more actions in response to the initiated script, wherein the performed action provides an interactive service to the user of the mobile device.

2. The system of claim 1, wherein the performance sub-system simulates a call to the user.

3. The system of claim 1, wherein the performance sub-system opens a browser on the mobile device.

4. The system of claim 1, wherein the performance sub-system plays a sound to the user.

5. The system of claim 1, wherein the event sub-system monitors progress in an ongoing event and receives the indication when the previously established event occurs during the ongoing event.

6. The system of claim 1, wherein the status of the mobile device relates to the date and time at the mobile device and the event sub-system receives an indication of an occurrence of the previously established event when the status of the mobile device is at a previously established date and time.

7. The system of claim 1, wherein the status of the mobile device relates to a location in a calendar stored at the mobile device and the event sub-system monitors calendar items inputted by the user and receives an indication of an occurrence of the previously established event when the mobile device reaches an inputted calendar item.

8. The system of claim 1, wherein the status of the mobile device relates to a geographic location of the mobile device and the event sub-system monitors the geographic location of the mobile device and receives an indication of an occurrence when the user reaches a previously established location.

9. A method for use with a mobile device, comprising:
   storing in a scripts database one or more scripts related to one or more actions to be performed for a user of the mobile device;
   receiving an indication of an occurrence of a previously established event, wherein the previously established event relates to a status of the mobile device independent of a status related to telecommunication functions of the mobile device;
   selecting a script from the one or more scripts stored in the scripts database in response to the received indication;
   initiating the selected script on the mobile device; and
   performing at least one action from the one or more actions in response to the initiated script, wherein the performed action provides an interactive service to the user of the mobile device.

10. The method of claim 9, further comprising simulating a call to the user.

11. The method of claim 9, further comprising opening a browser on the mobile device.

12. The method of claim 9, further comprising playing a sound to the user.

13. The method of claim 9, further comprising monitoring progress in an ongoing event and receiving the indication when the previously established event occurs during the ongoing event.

14. The method of claim 9, wherein the status of the mobile device relates to the date and time at the mobile device and the method further comprises receiving an indication of an occurrence of the previously established event when the status of the mobile device is at a previously established date and time.

15. The method of claim 9, wherein the status of the mobile device relates to a location in a calendar stored at the mobile device and the method further comprises monitoring calendar items inputted by the user and receiving an indication of an occurrence of the previously established event when the mobile device reaches an inputted calendar item.

16. The method of claim 9, wherein the status of the mobile device relates to a geographic location of the mobile device the method further comprises monitoring the geographic location of the mobile device and receiving an indication of an occurrence when the user reaches a previously established location.

17. A system for use with a mobile device, comprising:
   means for storing in a scripts database one or more scripts related to one or more actions to be performed for a user of the mobile device;
   means for receiving an indication of an occurrence of a previously established event, wherein the previously established event relates to a status of the mobile device independent of a status related to telecommunication functions of the mobile device;
   means, coupled to the means for storing and the means for receiving, for selecting a script from the one or more scripts stored in the scripts database in response to the received indication;
   means for initiating the selected script on the mobile device; and
   means, coupled to the means for initiating, for performing at least one action from the one or more actions in response to the initiated script, wherein the performed action provides an interactive service to the user of the mobile device.

* * * * *

UNITED STATES PATENT AND TRADEMARK OFFICE
CERTIFICATE OF CORRECTION

| | | |
|---|---|---|
| PATENT NO. | : 7,756,545 B2 | Page 1 of 1 |
| APPLICATION NO. | : 11/685108 | |
| DATED | : July 13, 2010 | |
| INVENTOR(S) | : Brian Roundtree | |

It is certified that error appears in the above-identified patent and that said Letters Patent is hereby corrected as shown below:

In column 1, line 10, delete "PCT/US2006062047," and insert -- PCT/US2006/062047, --, therefor.

In column 1, line 28, delete "an y" and insert -- any --, therefor.

Signed and Sealed this
Twenty-eighth Day of December, 2010

David J. Kappos
*Director of the United States Patent and Trademark Office*